United States Patent [19]

Nagashima et al.

[11] Patent Number: 4,761,041

[45] Date of Patent: Aug. 2, 1988

[54] FLUID PRESSURE CONTROL VALVE FOR VEHICLE BRAKING SYSTEM

[75] Inventors: Takashi Nagashima, Aichi; Eiji Miura, Kariya, both of Japan

[73] Assignee: Aisin Seiki Kabushiki Kaisha, Kariya, Japan

[21] Appl. No.: 925,113

[22] Filed: Oct. 29, 1986

[30] Foreign Application Priority Data

Oct. 29, 1985 [JP] Japan .................................. 60-165976
Nov. 1, 1985 [JP] Japan .................................. 60-169625

[51] Int. Cl.$^4$ .......................... B60T 8/00; B60T 13/00
[52] U.S. Cl. .................................. 303/9.62; 303/9.68
[58] Field of Search ............. 188/349; 303/23 R, 6 C, 303/24 R, 24 A, 24 C, 24 F

[56] References Cited

U.S. PATENT DOCUMENTS

| | | | |
|---|---|---|---|
| 4,141,596 | 2/1979 | Takeshita et al. ................. | 303/24 F |
| 4,411,476 | 10/1983 | Koshimizu .......................... | 303/6 C |
| 4,421,362 | 12/1983 | Shirai ..................................... | 303/92 |
| 4,444,436 | 4/1984 | Koshimizu .......................... | 303/6 C |

FOREIGN PATENT DOCUMENTS 54-147372 11/1979 Japan .
2032553 5/1980 United Kingdom .
2082706 3/1982 United Kingdom ............. 303/24 A
2147378 5/1985 United Kingdom .

*Primary Examiner*—Andres Kashnikow
*Assistant Examiner*—Timothy Newholm
*Attorney, Agent, or Firm*—Oblon, Fisher, Spivak, McClelland & Maier

[57] ABSTRACT

A fluid pressure control valve incorporated with dual hydraulic braking circuits connecting a tandem master cylinder to the left and right rear-wheel brake cylinders in a vehicle braking system. The control valve includes a pair of proportioning valves respectively disposed within the hydraulic braking circuits for modulating the hydraulic pressure applied to the rear-wheel brake cylinders, a pair of control plungers axially movable in response to fluid pressure in a hydraulic chamber to vary the spring load each acting on the proportioning valves, and a single inertia-controlled valve provided within an inlet pressure chamber of the control valve to interrupt the flow of fluid from one of the hydraulic braking circuits into the hydraulic chamber when a deceleration in excess of a predetermined value is attained.

3 Claims, 2 Drawing Sheets

FLUID PRESSURE CONTROL VALVE FOR VEHICLE BRAKING SYSTEM

BACKGROUND OF THE INVENTION

1. Field of the Invention

The present invention relates to fluid pressure control valves adapted for use in motor vehicle braking systems, and particularly, but not exclusively, to a fluid pressure control valve incorporated with dual hydraulic braking circuits connecting a tandem master cylinder to the left and right rear-wheel brake cylinders to independently modulate the hydraulic pressure applied to the rear-wheel brake cylinders from the master cylinder during braking.

2. Description of the Prior Art

In Japanese Patent Early Publication No. 54-147372, there has been proposed a fluid pressure control valve which includes first and second proportioning valves arranged in parallel with each other and disposed respectively within dual hydraulic braking circuits connecting a tandem master cylinder to the left and right rear-wheel brake cylinders. In the control valve, respective control plungers for the proportioning valves are received by a spring receiver and loaded by a single compression coil spring interposed between the spring receiver and a single control piston which is axially movable in response to fluid pressure applied thereto from one of the braking circuits through an inertia-controlled valve. In such an arrangement of the control valve, the spring receiver is provided as an equalizer for the control plungers. It is, therefore, apparent that if the center of the coil spring acting on the spring receiver is radially displaced towards one of the control plungers due to errors in manufacture and assembly of the spring receiver and the coil spring, the bias on one of the control plungers will differ from the bias on the other control plunger. This results in a difference in function between the proportioning valves and causes undesired problems during braking.

The control valve is further provided with a changeover valve which is arranged to apply fluid pressure from the other braking circuit to the inertia-controlled valve in the occurrence of damage of the one of the braking circuits. Such an arrangement of the changeover valve results in an increase of the manufacturing cost and size of the control valve and results in a complicated arrangement of the conduits for the control valve.

SUMMARY OF THE INVENTION

It is, therefore, a primary object of the present invention to provide an improved fluid pressure control valve wherein the respective loads acting on the proportioning valves are substantially equalized in a more reliable manner and in a simple construction.

A secondary object of the present invention is to provide an improved fluid pressure control valve, having the above-described characteristics, capable of ensuring a sufficient braking force in the occurrence of damage of one of the hydraulic braking circuits without providing such a changeover valve as described above.

According to the present invention, the primary object is attained by providing a fluid pressure control valve incorporated with dual hydraulic braking circuits connecting a tandem master cylinder to the left and right rear-wheel brake cylinders in a vehicle braking system, which comprises a pair of proportioning valves respectively disposed within the hydraulic braking circuits for modulating the hydraulic pressure applied to the rear-wheel brake cylinders, a pair of control plungers axially movable in response to fluid pressure in a hydraulic chamber to vary the spring load each acting on the proportioning valves, and a single inertia-controlled valve provided within an inlet pressure chamber of the control valve to interrupt the flow of fluid from one of the hydraulic braking circuits into the hydraulic chamber when a deceleration in excess of a predetermined value is attained.

In a practical embodiment of the present invention, the proportioning valves are arranged in parallel to one another, and the control plungers each are arranged coaxially with the proportioning valves and exposed to a hydraulic chamber formed at their one ends and communicated with the inlet pressure chamber of the control valve. Preferably, a spring loaded check valve is provided within the hydraulic chamber to interrupt the flow of fluid from the inlet pressure chamber into the hydraulic chamber until a deceleration in excess of a predetermined value is attained in an unloaded condition of the vehicle.

The secondary object of the present invention is attained by providing a fluid control valve wherein one of the proportioning valves is assembled within a support sleeve which is arranged to be applied at its one end with the hydraulic pressure applied to one of the rear-wheel brake cylinders and at its other end with the hydraulic pressure applied to the other rear-wheel brake cylinder, the support sleeve being axially movable and retained by a spring load applied thereto in a normal position in which the spring load acting on the one of the proportioning valves is varied in dependence upon axial movement of one of the control plungers. When the support sleeve is moved apart from the normal position due to lack of the hydraulic pressure in the other rear-wheel brake cylinder, the spring load acting on the one of the proportioning valves is increased in response to axial movement of the support sleeve.

BRIEF DESCRIPTION OF THE DRAWINGS

Additional objects, features and advantages of the present invention will become more readily apparent from the following detailed description of a preferred embodiment and modifications thereof when taken together with the accompanying drawings, in which:

FIG. 3 is a graph showing a relationship between a master cylinder pressure and the pressure applied to rear-wheel brake cylinders.

DESCRIPTION OF THE PREFERRED EMBODIMENTS

Figure 1:
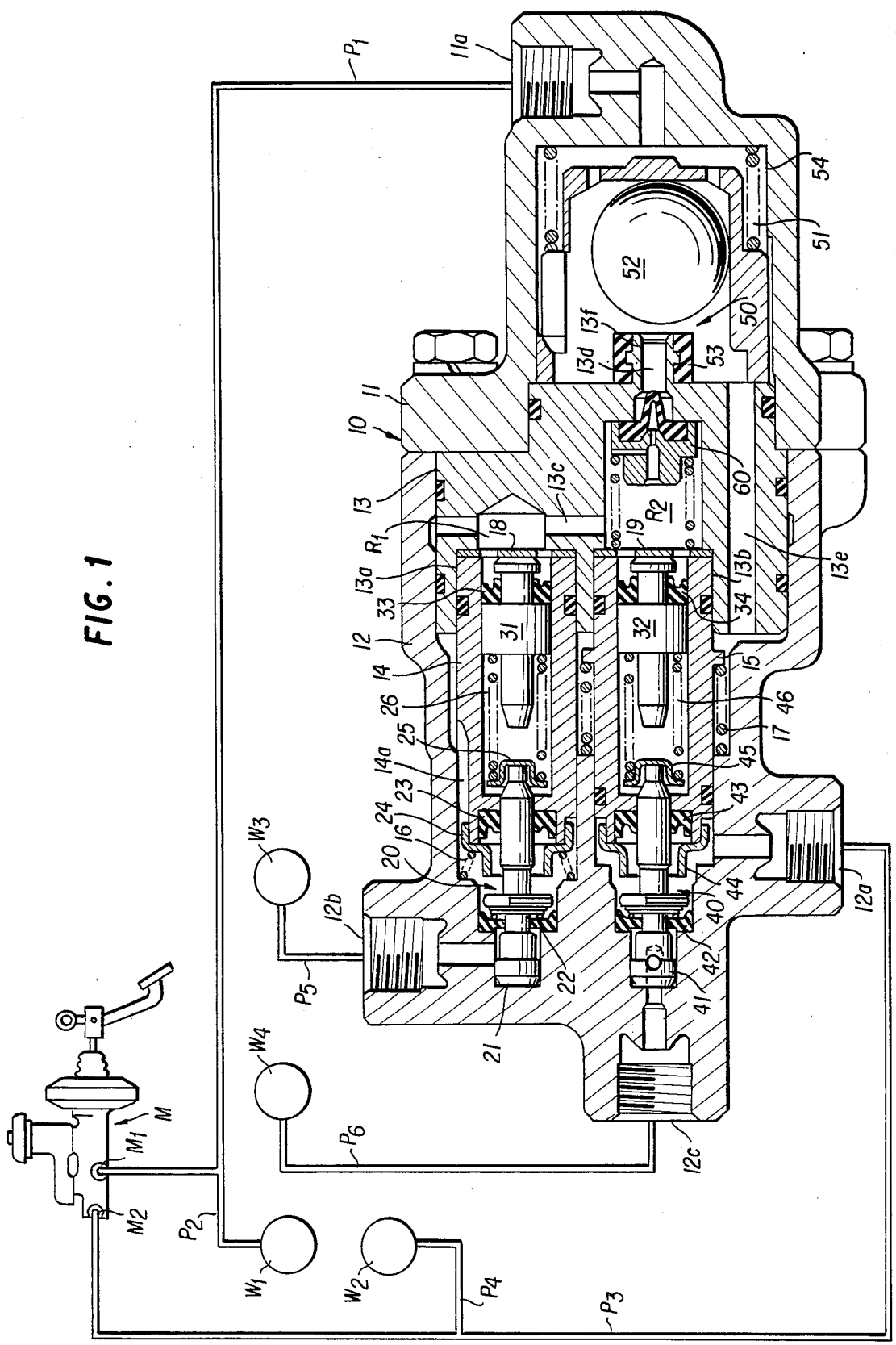
FIG. 1 is a sectional view of a fluid pressure control valve in accordance with the present invention which is incorporated with dual hydraulic braking circuits in a vehicle braking system.

Referring now to FIG. 1 of the drawings, there is illustrated a fluid pressure control valve in accordance with the present invention which is incorporated with dual hydraulic braking circuits connecting a master cylinder M to the left and right rear-wheel brake cylinders $W_3$ and $W_4$ in a vehicle braking system. The fluid pressure control valve includes a housing 10 adapted to be fixedly mounted at an inclined angle on a vehicle body, the housing 10 consisting of housing bodies 11 and 12 coupled to each other in a fluid-tight manner. The housing body 11 is formed with a first inlet port 11a connected to a first pressure chamber $M_1$ of master cylinder M by way of a conduit $P_1$, while the housing body 12 is formed with a second inlet port 12a connected to a second pressure chamber $M_2$ of master cylinder M by way of a conduit $P_3$, a first outlet port 12b connected to the left rear-wheel brake cylinder $W_3$ by way of a conduit $P_5$, and a second outlet port 12c connected to the right rear-wheel brake cylinder $W_4$ by way of a conduit $P_6$. The conduit $P_1$ is connected to the right front-wheel brake cylinder $W_1$ through a bypass conduit $P_2$, while the conduit $P_3$ is connected to the left front-wheel brake cylinder $W_2$ through a bypass conduit $P_4$. The first inlet port 11a is communicated with the first outlet port 12b through the interior of housing 10, while the second inlet port 12a is communicated with the second outlet port 12c through the interior of housing 10.

The fluid pressure control valve includes a support 13 assembled within the housing 10 in a fluid-tight manner to subdivide the interior of housing 10 into an inlet pressure chamber and an outlet pressure chamber, a pair of cylinder sleeves 14 and 15 assembled in parallel to one another within the outlet pressure chamber of housing 10, and a pair of proportioning valves 20 and 40 respectively coaxial with the cylinder sleeves 14 and 15. The proportioning valve 20 comprises a stepped differential piston 21 axially slidably supported by the cylinder sleeve 14 through an annular seal member 23 and having a valve portion which cooperates with a valve seat 22 secured to an annular shoulder in housing 10 to control the flow of fluid passing therethrough in dependence upon axial movement of piston 21. Similarly, the proportioning valve 40 comprises a stepped differential piston 41 axially slidably supported by the cylinder sleeve 15 through an annular seal member 43 and having a valve portion which cooperates with a valve seat 42 secured to an annular shoulder in housing 10 to control the flow of fluid passing therethrough in dependence upon axial movement of piston 41.

The support 13 is formed therein with a pair of parallel stepped axial bores 13a and 13b, a radial passage 13c for a fluid communication between axial bores 13a and 13b, and an axial passage 13e for a fluid communication between the inlet and outlet pressure chambers in housing 10. The cylinder sleeve 14 is disposed within the stepped axial bore 13a of support 13 through a perforated support plate 18 to form a first hydraulic chamber $R_1$ and is positioned by a retainer 24 which is engaged with an annular shoulder of cylinder sleeve 14 and loaded toward the support 13 by means of a compression coil spring 16 received by the inner end wall of housing 10. The cylinder sleeve 14 is formed at its outer periphery with an axial recess 14a which is arranged to communicate the axial passage 13e of support 13 to the proportioning valve 20 therethrough. A first control plunger 31 is axially slidably disposed within the cylinder sleeve 14 through an annular seal member 33 and urged by a coil spring 26 to be in abutment against the support plate 18. The coil spring 26 is engaged at its one end with the piston 21 through a retainer 25 and at its other end with the control plunger 31. The coil spring 26 is applied with a predetermined load and biasses the piston 21 toward a normal position in which the proportioning valve 20 is opened to permit the flow of fluid from the first inlet port 11a to the first outlet port 12b through the axial passage 13e of support 13, an annular space around the cylinder sleeves 14, 15 and the axial recess 14a of cylinder sleeve 14.

Similarly, the cylinder sleeve 15 is disposed within the stepped axial bore 13b of support 13 through a perforated support plate 19 to form a second hydraulic chamber $R_2$ and is positioned by a compression coil spring 17 which is engaged at its one end with an annular end wall in housing 10 and at its other end with an annular flange of sleeve 15. A retainer 44 is fixedly coupled with an annular shoulder of cylinder sleeve 15 to contain the seal member 43 therein. A second control plunger 32 is axially slidably disposed within the cylinder sleeve 15 through an annular seal member 34 and urged by a coil spring 46 to be in abutment against the support plate 19. The coil spring 46 is engaged at its one end with the piston 41 through a retainer 45 and at its other end with the control plunger 32. The coil spring 46 is applied with a predetermined load and biasses the piston 41 toward a normal position in which the proportioning valve 40 is opened to permit the flow of fluid between the second inlet and outlet ports 12a and 12c therethrough.

The support 13 is integrally formed with a tubular base 13f which is provided therein with a stepped bore 13d. Assembled within the inlet pressure chamber of housing body 11 is an inertia-controlled valve 50 which includes a ball cup 51, a metallic valve ball 52, and an annular valve seat 53 of elastomeric material secured to the tubular boss 13f of support 13. The ball cup 51 is engaged with the support 13 and held in place by a compression coil spring 54 received by the inner end wall of housing body 11. The valve ball 52 is free to roll up the inclined bottom of ball cup 51 into engagement with the valve seat 53 to provide a cut-off valve for interrupting fluid communication between the inlet pressure chamber and the hydraulic chambers $R_1$, $R_2$. The ball 52 normally rests under gravity in the position shown to open the cut-off valve. When the rate of deceleration caused by application of the brakes exceeds a predetermined value, the ball 52 will move into engagement with the valve seat 53 to close the cut-off valve. In addition, a spring loaded check valve 60 is assembled within the hydraulic chamber $R_2$ to interrupt the flow of fluid from the inlet pressure chamber into the hydraulic chamber $R_2$.

When the brake pedal is depressed to actuate the master cylinder M, the hydraulic pressure exerted in the first pressure chamber $M_1$ of master cylinder M is directly applied to the right front-wheel cylinder $W_1$ through the conduits $P_1$, $P_2$ and applied to the first inlet port 11a of the control valve through the conduit $P_1$, while the hydraulic pressure exerted in the second pressure chamber $M_2$ of master cylinder M is directly applied to the left front-wheel brake cylinder $W_2$ through the conduits $P_3$, $P_4$ and applied to the second inlet port 12a of the control valve through the conduit $P_3$. In the control valve, the pressurized fluid flows into the left rear-wheel brake cylinder $W_3$ through the inlet pressure chamber, the axial passage 13e, the axial recess 14a of cylinder sleeve 14, the first proportioning valve 20, the first outlet port 12b, and the conduit $P_5$, while the pressurized fluid flows into the right rear-wheel brake cylinder $W_4$ through the second proportioning valve 40, the second outlet port 12c, and the conduit $P_6$. Thus, the front and rear wheel brake cylinders operate the brakes in response to the master cylinder pressure. When the vehicle deceleration reaches the predetermined value, the ball 52 rolls forwards, moves into engagement with the valve seat 53, and closes the cut-off valve to interrupt the fluid communication between the inlet pressure chamber and the hydraulic chamber $R_2$. At this stage, the hydraulic pressure in the rear wheel brake cylinders $W_3$, $W_4$ will differ in dependence upon the loaded condition of the vehicle as described hereinafter.

When the vehicle deceleration reaches the predetermined value in an unloaded condition of the vehicle, the check valve 60 is maintained in the closed position to interrupt the flow of fluid from the inlet pressure chamber into the hydraulic chambers $R_1$, $R_2$ until the ball 52 closes the cut-off valve. During the operation, the control plungers 31, 32 remain in the position shown because the pressure in the hydraulic chambers $R_1$, $R_2$ is still at a low valve, and the spring load each acting on the pistons 21, 41 remains at a constant value. As a result, the pistons 21, 41 move rearwardly under the hydraulic pressure acting on each effective surface area difference of the pistons 21, 41 and opposing the springs 26, 46 to close the proportioning valves 20, 40. Subsequently, opening and closing of the respective proportioning valves 20, 40 are conducted in accordance with the reciprocation of pistons 21, 41 so that the pressure applied to the rear wheel brake cylinders $W_3$, $W_4$ increases as shown by a solid line O - A - B in FIG. 3.

When the vehicle deceleration reaches the predetermined value in a loaded condition of the vehicle, the check valve 60 is opened to permit the flow of fluid from the inlet pressure chamber into the hydraulic chambers $R_1$, $R_2$ before closing of the cut-off valve. During this operation, the pressure in the hydraulic chambers $R_1$, $R_2$ increases to displace the control plungers 31, 32 against the springs 26, 46 in a predetermined distance before closing of the cut-off valve, and the spring load each acting on the pistons 21, 41 increases in accordance with the axial displacement of control plungers 31, 32. As a result, the pressure applied to the rear-wheel brake cylinders $W_3$, $W_4$ is controlled as shown by a solid line O - C - D in FIG. 3.

If the conduit $P_1$ or $P_5$ is damaged in each operation described above, the pressure in the hydraulic chambers $R_1$, $R_2$ will not increase, and the control plungers 31, 32 will remain in the position shown in the figure. In such a condition, the spring load each acting on the pistons 21, 41 will remain at the constant value. As a result, the pressure applied to the rear-wheel brake cylinder $W_4$ will increase as shown by the solid line O - A - B in FIG. 3. If the conduit $P_3$ or $P_6$ is damaged, the vehicle deceleration will not reach the predetermined value until the pressure in the left rear-wheel brake cylinder $W_3$ exceeds the value C in FIG. 3. In such a condition, the pressure in the hydraulic chambers $R_1$, $R_2$ will increase to a value higher than that in the normal condition, and the first control plunger 31 will be engaged with the piston 21 against the spring 26 to hold the piston 21 in the normal position shown in the figure. As a result, the pressure applied to the left rear-wheel brake cylinder $W_3$ will be controlled as shown by a solid line O - E in FIG. 3.

From the above description, it will be understood that the spring load each acting on the pistons 21, 41 is controlled in dependence upon the same hydraulic pressure each applied to the control plungers 31, 32 in the hydraulic chambers $R_1$, $R_2$ under control of the single inertia-controlled valve 50. In such an arrangement of the control plungers 31, 32, the respective spring loads acting on the pistons 21, 41 are substantially equalized. Even if there was an error in manufacture of the control plungers 31, 32, a difference between the spring loads would be limited in a small value. Thus, any difference in function between the proportioning valves 20 and 40 does not occur during the braking operation.

Figure 2:
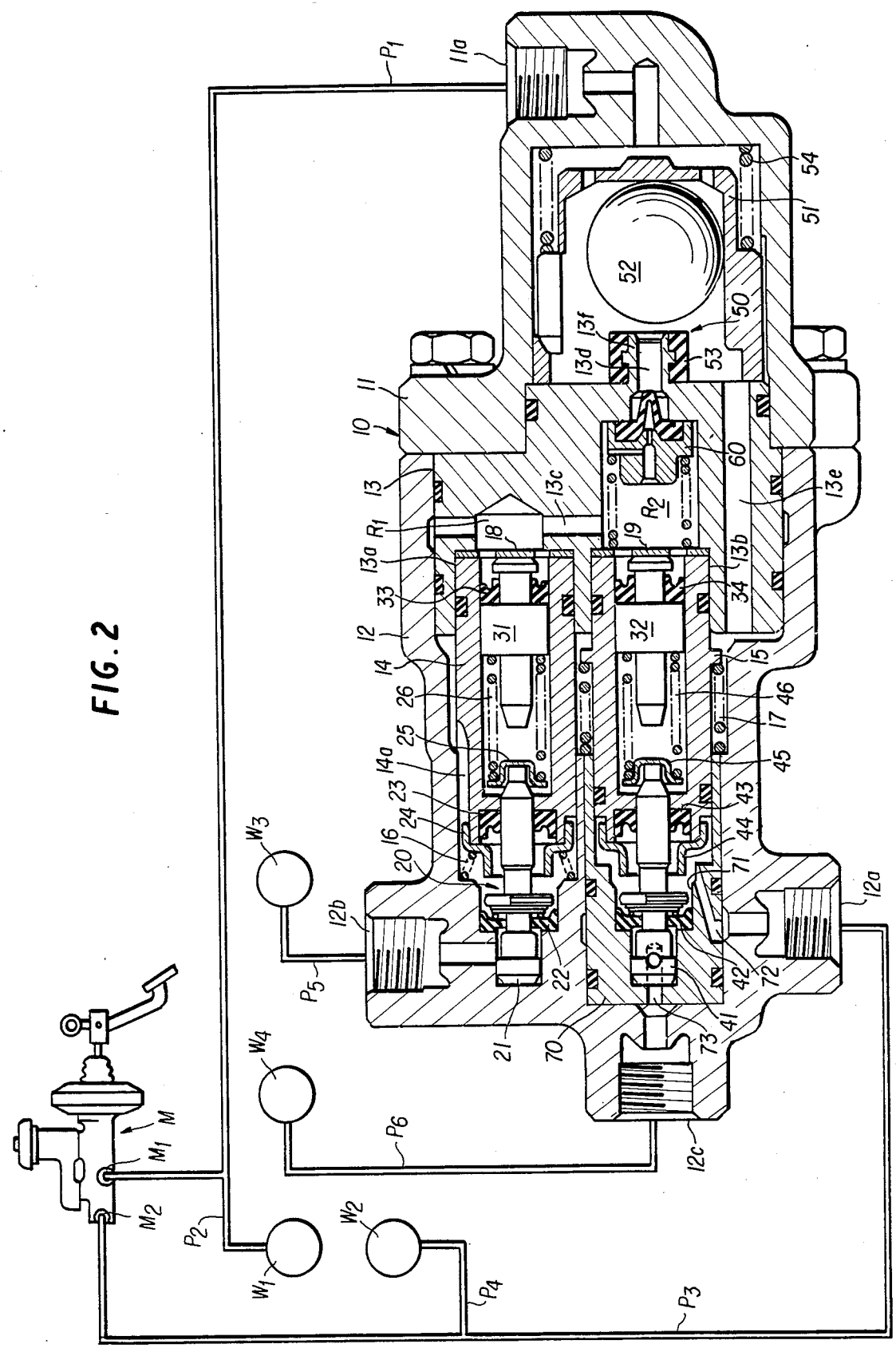
FIG. 2 is a sectional view of a modification of the control valve unit shown in FIG. 1.

In FIG. 2 there is illustrated a modification of the fluid pressure control valve in which the second proportioning valve 40 is coaxially assembled within a support sleeve 70 which is axially slidably coupled over the cylinder sleeve 15 and is urged by the coil spring 17 to be in abutment against the inner end wall of housing body 12. The coil spring 17 is engaged at its one end with the right end of support sleeve 70 and at its other end with the annular flange of cylinder sleeve 15. The support sleeve 70 is arranged to be applied at its left end with the hydraulic pressure applied to the left rear-wheel brake cylinder $W_4$ and to be applied at its right end with the hydraulic pressure applied to the right rear-wheel brake cylinder $W_3$. The support sleeve 70 is formed therein with a stepped bore 71 in which the second stepped differential piston 41 is axially slidably disposed and in which the valve seat 42 is secured in place to cooperate with the valve portion of piston 41. The support sleeve 70 is further formed at its peripheral portion with a passage 72 for a fluid communication between the second inlet port 12a and the interior of stepped bore 71 and is formed at its left end portion with a passage 73 for a fluid communication between the second outlet port 12c and the interior of stepped bore 71. Other component parts and construction are substantially the same as those of the fluid pressure control valve shown in FIG. 1. In the case that the dual hydraulic braking circuits each are in a normal condition, the operation of the modified control valve is substantially the same as that of the fluid pressure control valve shown in FIG. 1.

Assuming that the conduit $P_1$ or $P_5$ is damaged during the braking operation, the pressure in the hydraulic chambers $R_1$, $R_2$ will not increase, and the control plungers 31, 32 will remain in the position shown in the figure. In such a condition, the support sleeve 70 for the second proportioning valve 40 is displaced rightwards by the hydraulic pressure applied to its left end against the coil spring 17, and in turn, the second stepped differential piston 41 is displaced against the coil spring 46 to increase the spring load acting thereon. As a result, the piston 41 is held in the normal position to maintain the proportioning valve 40 in the open position. Thus, the pressure applied to the right rear-wheel brake cylinder $W_4$ will be controlled as shown by the solid line O - E in FIG. 3.

Assuming that the conduit $P_3$ or $P_6$ is damaged, the vehicle deceleration does not reach the predetermined value until the pressure in the left rear-wheel brake cylinder $W_3$ exceeds the value C in FIG. 3. In such a condition, the pressure in the hydraulic chambers $R_1$, $R_2$ increases to a value higher than that in the normal condition, and the first control plunger 31 is engaged with the piston 21 against the spring 26 to hold the piston 21 in the normal position shown in the figure. As a result, the pressure applied to the left rear-wheel brake cylinder $W_3$ will be controlled as shown by the solid line O - E in FIG. 3.

From the above description, it will be understood that in the modified control valve, the support sleeve 70 is coaxially coupled over the cylinder sleeve 15 to effect a sufficient braking force in the occurrence of damage of either one of the dual hydraulic braking circuits.

Although certain specific embodiments of the present invention have been shown and described, it is obvious that many modifications and variations thereof are possible in light of these teachings. It is to be understood, therefore, that within the scope of the appended claims, the invention may be practiced otherwise than as specifically described herein.

What is claimed is:

1. A fluid pressure control valve incorporated with dual hydraulic braking circuits connecting a tandem master cylinder to the left and right rear-wheel brake cylinders in a vehicle braking system, the control valve comprising:
    a housing provided with first and second inlet ports respectively for connection to said master cylinder and with first and second outlet ports respectively for connection to said rear-wheel brake cylinders;
    a pair of proportioning valves disposed within said housing in parallel to one another and arranged respectively between said first inlet and outlet ports and between said second inlet and outlet ports for independently modulating hydraulic pressure applied therethrough to said rear-wheel brake cylinders from said master cylinder, said proportioning valves each being urged toward an open position by means of a spring load acting thereon;
    a pair of control plungers each arranged coaxially with said proportioning valves and exposed at their one ends to a hydraulic chamber in communication with one of said inlet ports, said control plungers being axially movable in response to hydraulic pressure applied to the hydraulic chamber to vary the spring load each acting on said proportioning valves; and
    a single inertia-controlled valve means disposed within an inlet pressure chamber between the one of said inlet ports and the hydraulic chamber said inertia-controlled valve means being operable to interrupt the flow of fluid under pressure from the inlet pressure chamber into the hydraulic chamber when a deceleration in excess of a predetermined value is attained.

2. A fluid pressure control valve as claimed in claim 1, wherein a spring loaded check valve means is provided within the hydraulic chamber to interrupt the flow of fluid from the inlet pressure chamber into the hydraulic chamber until a deceleration in excess of a predetermined value is attained in an unloaded condition of the vehicle.

3. A fluid pressure control valve as claimed in claim 1, wherein one of said proportioning valves is disposed within an axially movable support sleeve which is arranged within said housing in such a manner as to be applied at one end thereof with the hydraulic pressure applied to one of said rear-wheel brake cylinders and at another end thereof with the hydraulic pressure applied to the other rear-wheel brake cylinder, said support sleeve being retained by a spring load acting thereon in a normal position in which the spring load acting on the one of said proportioning valves is varied in dependence upon axial movement of one of said control plungers.

* * * * *